US008647773B2

(12) United States Patent
Goodenough et al.

(10) Patent No.: US 8,647,773 B2
(45) Date of Patent: Feb. 11, 2014

(54) NIOBIUM OXIDE COMPOSITIONS AND METHODS FOR USING SAME

(75) Inventors: John B. Goodenough, Austin, TX (US); Jian-Tao Han, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 368 days.

(21) Appl. No.: 13/194,551

(22) Filed: Jul. 29, 2011

(65) Prior Publication Data

US 2012/0052401 A1 Mar. 1, 2012

Related U.S. Application Data

(60) Provisional application No. 61/369,515, filed on Jul. 30, 2010.

(51) Int. Cl.
*H01M 4/58* (2010.01)
(52) U.S. Cl.
USPC .................................. 429/231.5; 429/231.95
(58) Field of Classification Search
None
See application file for complete search history.

(56) References Cited

U.S. PATENT DOCUMENTS

| 7,682,746 | B2 | 3/2010 | Koshina | 429/231.1 |
| 2005/0003277 | A1 | 1/2005 | Lee et al. | 429/322 |
| 2005/0008935 | A1 | 1/2005 | Skotheim et al. | 429/218.1 |
| 2009/0214958 | A1 | 8/2009 | Park | 429/324 |

OTHER PUBLICATIONS

Wadsley A.D., Mixed Oxides of Titanium and Niobium, Aug. 17, 1960, Acta Crystallographica 1961 vol. 14, pp. 660-664.*
International Search Report and Written Opinion; PCT/US2011/045964; pp. 12, Mar. 2, 2012.
Tian, "Niobium doped lithium titanate as a high rate anode material for Li-ion batteries"; Electrochimica Acta, vol. 55, pp. 5453-5458, Apr. 24, 2010.
John B. Goodenough (presenter) and Jian-Tao Han (contributor); Presentation Slide and Table of Contents of Meeting Abstracts, 15th International Meeting on Lithium Batteries, Montreal, Jun. 27-Jul. 2, 2010, pp. 53, Jun. 28, 2010.
International Preliminary Report on Patentability; PCT/US2011/045964; pp. 7, Feb. 14, 2013.

* cited by examiner

*Primary Examiner* — Maria J Laios
(74) *Attorney, Agent, or Firm* — Baker Botts L.L.P.

(57) ABSTRACT

The disclosure relates a niobium oxide useful in anodes of secondary lithium ion batteries. Such niobium oxide has formula $Li_xM_{1-y}Nb_yNb_2O_7$, wherein $0 \leq x \leq 3$, $0 \leq y \leq 1$, and M represents Ti or Zr. The niobium oxide may be in the form of particles, which may be carbon coated. The disclosure also relates to an electrode composition containing at least one or more niobium oxides of formula $Li_xM_{1-y}Nb_yNb_2O_7$. The disclosure further relates to electrodes, such as anodes, and batteries containing at least one or more niobium oxides of formula $Li_xM_{1-y}Nb_yNb_2O_7$. Furthermore, the disclosure relates to methods of forming the above.

17 Claims, 13 Drawing Sheets

FIG. 4A1
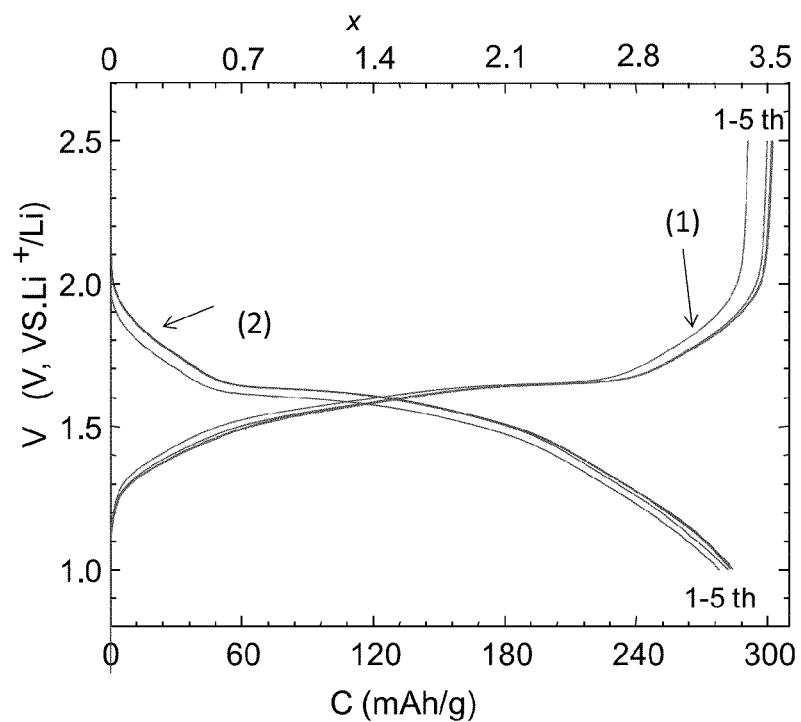
FIG. 4A2
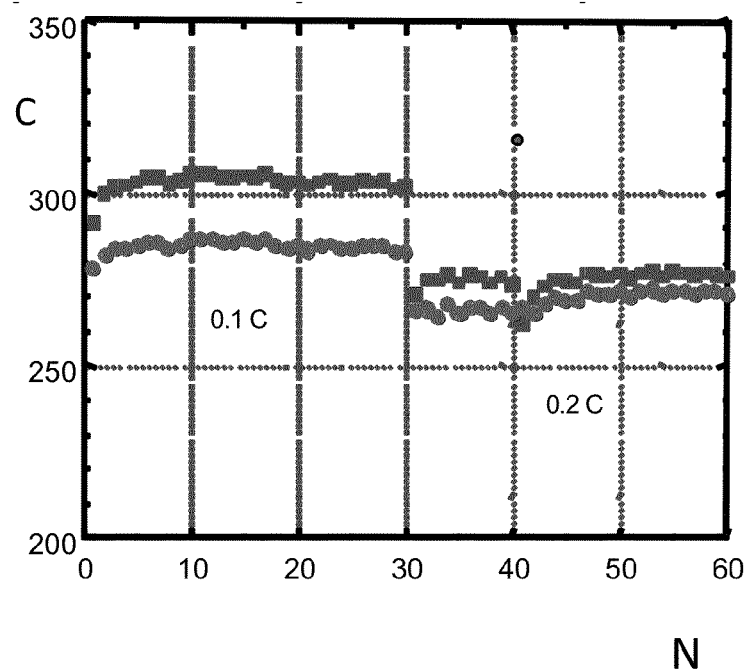

FIG. 4B1
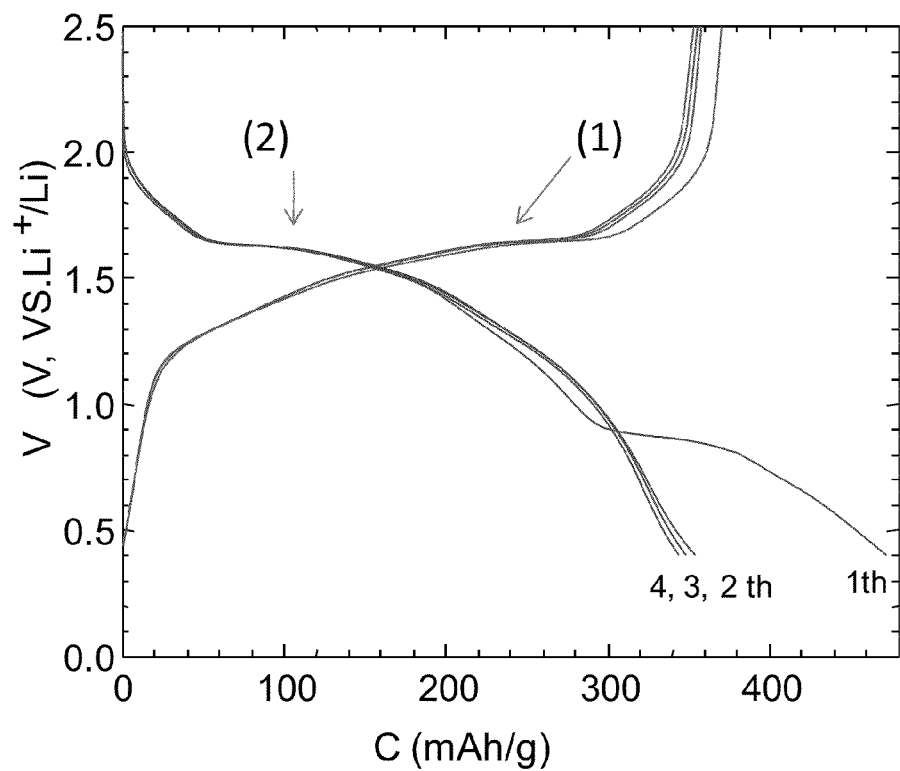
FIG. 4B2
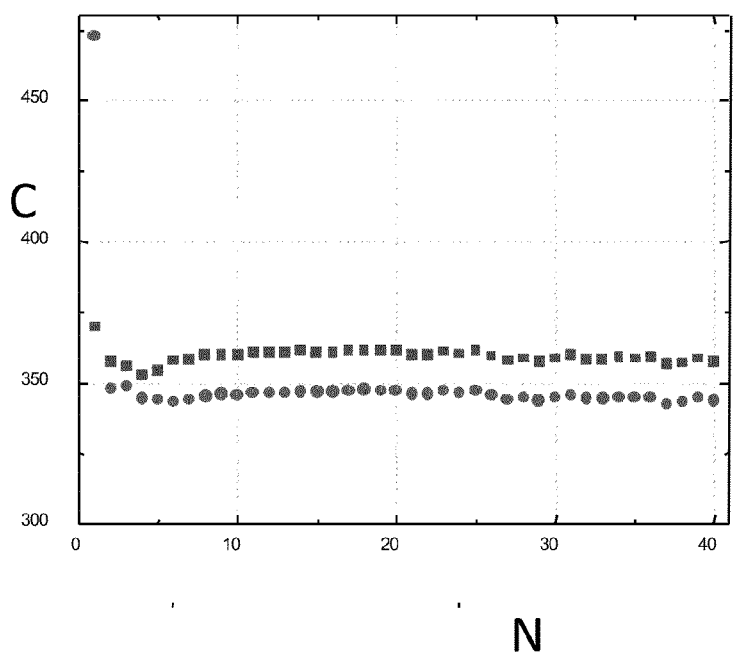

FIG. 4C1
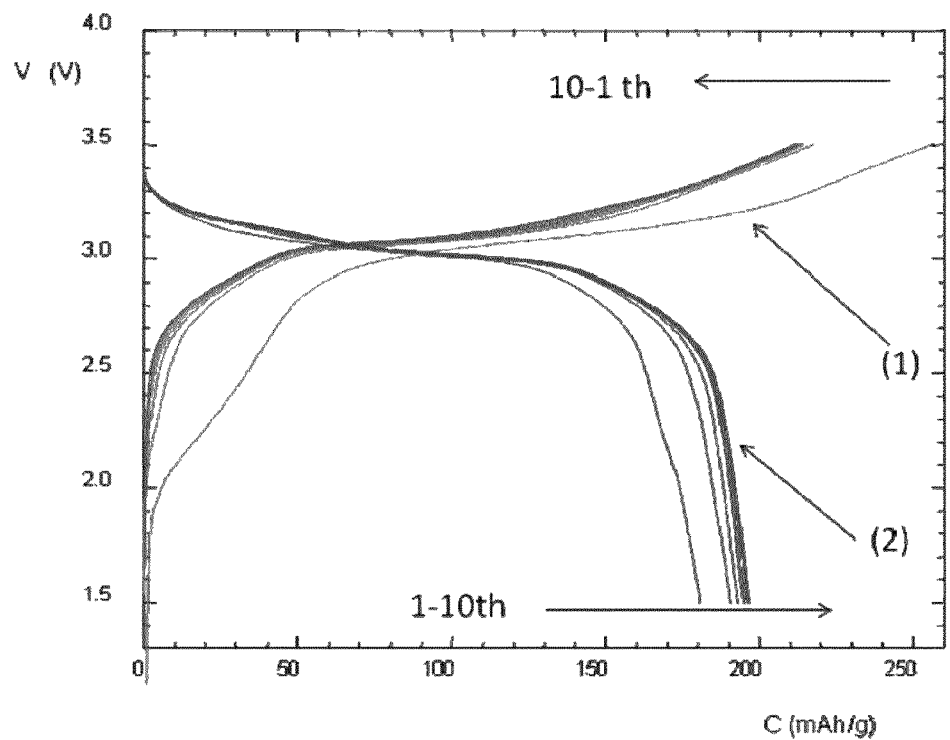
FIG. 4C2
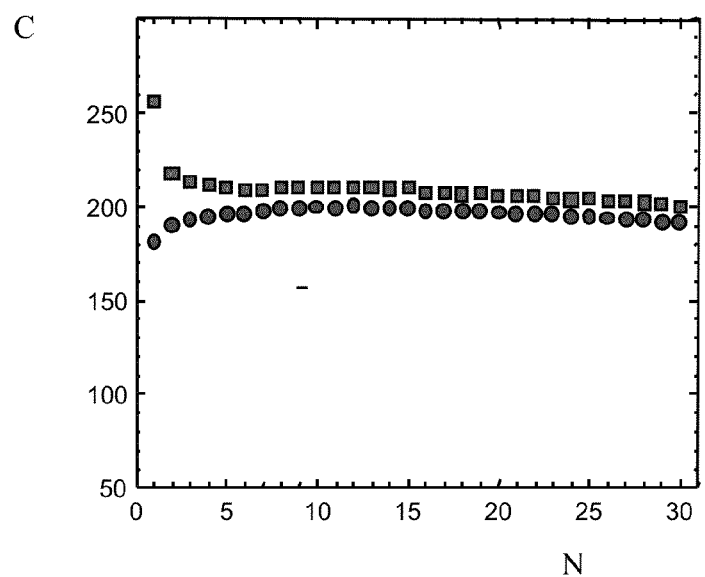

NIOBIUM OXIDE COMPOSITIONS AND METHODS FOR USING SAME

PRIORITY CLAIM

The current application claims priority under 35 U.S.C. §119(e) to U.S. Provisional Patent Application Ser. No. 61/369,515, filed Jul. 30, 2010 and titled "Niobium Oxide Compositions and Methods for Using Same," incorporated by reference herein in its entirety.

STATEMENT OF GOVERNMENT INTEREST

At least a portion of the present invention was developed using funding from the United States Department of Energy provided through Lawrence Berkley National Laboratory, Grant No. 6805919 MOD 8. The United States government has certain rights in the invention.

TECHNICAL FIELD

The present disclosure relates to a niobium oxide composition useful in electrodes, particularly anodes, of secondary lithium ion batteries, electrodes and secondary batteries containing such composition, and methods of their use in electrodes and secondary batteries.

TECHNICAL BACKGROUND

Secondary (rechargeable) lithium ion batteries are widely utilized in consumer electronic devices such as cell phones and laptop computers owing, in part, to their high energy density. A secondary battery stores electrical energy as chemical energy in two electrodes, an anode (the reductant) and a cathode (the oxidant). In a secondary rechargeable lithium ion battery, the anode and the cathode are kept apart inside the battery by a separator that is permeable to a lithium-ion electrolyte that allows lithium ions ($Li^+$) to pass between the electrodes inside the battery, but forces the electrons to move in an external electronic circuit. The anode and the cathode normally include compounds into which lithium ions may be reversibly inserted. The electrolyte typically contains as lithium salt dissolved in an organic liquid to produce lithium ions. Often the electrolyte contains a flammable organic liquid carbonate. Conventional lithium ion batteries generally use an anode that has an electrochemical potential poorly matched to the energy at which the electrolyte is reduced, which results in a lower capacity and may introduce an internal short-circuit that sets the electrolyte on fire unless charging rates are controlled.

Conventional lithium-ion secondary batteries are designed so that the electrolyte has a window between its LUMO (lowest occupied molecular orbital) and HOMO (highest occupied molecular orbital). This window is typically between 1.1 and 4.3 eV below the Fermi energy (electrochemical potential) of elemental Lithium. Conventional lithium-ion secondary batteries also have an open-circuit voltage described by the equation:

$$V_{OC} = (E_{FA} - E_{FC})/e$$

where $E_{FA}$ is the Fermi energy of the anode, $E_{FC}$ is the Fermi energy of the cathode, and e is the magnitude of the charge of an electron. If $E_{FA}$ lies above the energy of the electrolyte's LUMO, the electrolyte will be reduced during use of the battery unless a passivation layer forms on the anode surface. Such a solid-electrolyte interphase (SEI) passivation layer contains elemental Lithium ($Li^0$) in order not to block lithium ion transfer across it.

When a conventional lithium ion secondary battery is charged, lithium ions are transferred from the electrolyte to the anode. Electrons ($e^-$) are also transferred to the anode at the same time. Higher voltages can be used to charge batteries more quickly, but if the voltage used in order to obtain a fast charge raises the energy of the incoming electrons above the Fermi energy (electrochemical potential) of metallic lithium, the lithium ions will inhomogenously plate out of the electrolyte onto the anode as elemental Lithium. If such a process occurs, the anode can develop a mossy surface and, eventually, a lithium dendrite can grow through the electrolyte to the cathode and short-circuit the battery with catastrophic results, such as a fire.

To prevent such short-circuits, carbon is typically used as the anode material into which lithium ions are be reversibly inserted. Insertion of lithium ions into carbon is a two phase reaction from C to $LiC_6$ and provides a flat voltage of approximately 0.2 V versus $Li^+/Li^0$. Unfortunately, the electrochemical potential of reduced carbon is above the electrolyte LUMO and thus carbon anodes form a passivating SEI layer as described above. This layer increases the impedance of the anode, robs lithium irreversibly from the cathode on the initial charge, and limits the charging voltage and thus the rate of charge. If the cell is charged too rapidly (typically at a voltage of 1.0 V versus $Li^+/Li^0$), lithium ions are not able to traverse the SEI layer before they are plated out on the surface of the SEI layer as elemental Lithium, also as described above. This problem limits the rate of charge of a battery and can necessitate additional circuitry as a safety measure against battery short-circuits. In addition, the capacity of the cathode normally limits the capacity of a cell, and the entrapment of lithium in the anode SEI layer during charge can reduce the capacity of the cathode and therefore the energy stored in the cell.

One alternative anode material is the spinel $Li_4Ti_5O_{12}$ (Li$[Li_{1/3}Ti_{5/3}]O_4$). Such an anode operates on the Ti(IV)/Ti(III) redox couple located at 1.5 V versus $Li^+/Li^0$. Such anodes are capable of a fast charge and a long cycle life because no SEI layer is formed. However, the material has a low specific capacity (≈120 mAh/g) and the loss of 1.3 V relative to a carbon anode reduces the relative energy density of a battery using such a titanium-based anode. Therefore, there is a motivation to identify a solid anode material with a higher capacity and having a voltage in the range of $1.1 \leq V \leq 1.5$ V versus $Li^+/Li^0$.

SUMMARY OF THE INVENTION

In accordance with the purpose(s) of the invention, as embodied and broadly described herein, this disclosure relates to niobium oxide compositions that may, in various aspects, be used in anodes of secondary lithium ion batteries.

In one aspect, the present disclosure provides an anode material comprising a niobium oxide.

In another aspect, the present disclosure provides an anode comprising a niobium oxide as the active electrode material.

In yet another aspect, the present disclosure provides a lithium ion battery containing said anode.

BRIEF DESCRIPTION OF THE FIGURES

The accompanying figures, which are incorporated in and constitute a part of this specification, illustrate several aspects and together with the description serve to explain the principles of the invention.

FIGS. 4 illustrate electrochemical characterization of the carbon-coated TNO. FIG. 4A represents charge/discharge galvanostatic curves at C/10 for a Li/C-TNO cell cycled between 1.0 and 2.5 V (vs Li$^+$/Li), x being the number of Li$^+$ ions inserted (FIG. 4A1), together with its capacity C (in mAh/g) retention over a number N of cycles, up to 30 cycles at a rate of 0.1 C and then at a rate of 0.2 C up to the 60th cycle (FIG. 4A2). FIG. 4B represents charge/discharge galvanostatic curves at C/10 for a Li/C-TNO cell cycled between 0.4 and 2.5 V (vs Li$^+$/Li) (FIG. 4B1), together with its capacity C (in mAh/g) retention over a number N of cycles, up to 40 cycles (FIG. 4B2). FIG. 4C represents charge/discharge galvanostatic curves for a LNMO/C-TNO full cell at C/10 with capacity limited by C-TNO (the amount of LNMO being in excess compared to the amount of C-TNO) cycled between 1.5 and 3.5 V (vs Li$^+$/Li) (FIG. 4C1), together with its capacity C (in mAh/g) retention over a number N of cycles up to 30 cycles (FIG. 4C2).

FIG. 5 illustrates electrochemical characterization of the bare TNO, C-TNO, and C-DTNO under three different testing modes. Cells having niobium oxide in the working electrode and lithium metal at the counter electrode were tested: (I) discharged at 0.1 C, charged at 0.1-32 C; (II) charged at 0.1 C, discharged at 0.1-2 C; and (III) charged and discharged both at 0.1-2 C. The cycle cutoff voltage range was 1.4-2.5 V without any holding voltage in above models. In FIGS. 5A, 5B and 5C, curves marked (1) correspond to charge and curves marked (2) correspond to discharge.

FIG. 6 illustrates electrochemical characterization of the C-DTNO at high rate: discharge current fixed at 2 C (0.5 hour for full discharge) without any holding of the voltage; and charge at very high rate until the charging time reaches 6 seconds, in accordance with various aspects of the present invention. The electrode formulation for all experiments is: active material (C-DTNO) (65 wt %), total carbon (30 wt %) and binder (5 wt %). In FIG. 6A, curves marked (1) correspond to charge and curves marked (2) correspond to discharge.

DETAILED DESCRIPTION

Figure 1:
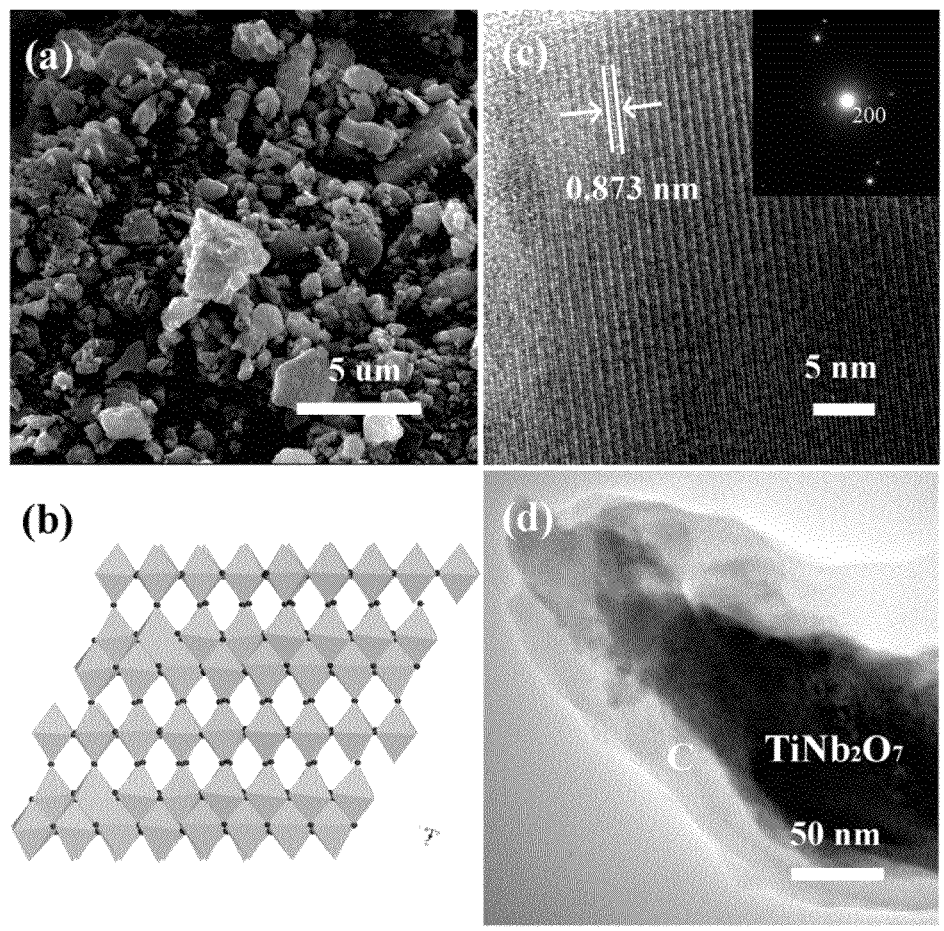
FIG. 1(a) is a scanning electron micrograph of a bare TNO sample.
FIG. 1(b) illustrates the crystal structure of TNO with: lattice parameters in C2/m space group a=20.351(3) Å, b=3.801(2) Å, c=11.882(2) Å, α=γ=90°, β=120.19(1); Nb occupancy ⅔ and Ti occupancy ⅓ in the same site (48109-ICSD).
FIG. 1(c) is a high resolution transmission electron micrograph (HR-TEM) of a bare TNO sample, with the inset showing the corresponding SAED pattern.
FIG. 1(d) is a transmission electron micrograph of a C-TNO sample.

The present invention may be understood more readily by reference to the following detailed description and the Examples included therein.

Certain abbreviations commonly used throughout the specification are as follows:
  TNO means TiNb$_2$O$_7$
  DTNO means Ti$_{1-y}$Nb$_y$Nb$_2$O$_7$
  HR-TEM means "High Resolution Transmission Electron Micrograph"
  SAED means "Specific Area Electron Diffraction"
  ZFC means "cooled in zero-magnetic field"
  LNMO means LiNi$_{0.5}$Mn$_{1.5}$O$_4$
  C-TNO means carbon coated TiNb$_2$O$_7$
  C-DTNO means carbon coated DTNO
  bare TNO means uncoated TiNb$_2$O$_7$
  bare DTNO means uncoated Ti$_{1-y}$Nb$_y$Nb$_2$O$_7$
  C— means a carbon coating, not merely a carbon atom bound to other atoms by a chemical bond.

The present specification makes reference to batteries. As used herein, a "battery" may be a single electrochemical cell or a combination of more than one electrochemical cells, including any additional components such as wires and casings, unless it is otherwise clear from context that a single electrochemical cell is referenced.

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. It is also to be understood that the terminology used herein is for the purpose of describing particular aspects only and is not intended to be limiting.

All publications mentioned herein are incorporated herein by reference to disclose and describe the methods and/or materials in connection with which the publications are cited.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, example methods and materials are now described.

As used in the specification and the appended claims, the singular forms "a," "an" and "the" include plural referents unless the context clearly dictates otherwise. Thus, for example, reference to "an electrolyte" includes mixtures of two or more electrolytes.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "optional" or "optionally" means that the subsequently described event or circumstance can or cannot occur, and that the description includes instances where said event or circumstance occurs and instances where it does not.

The present specification discloses components that may be used to prepare the compositions of the invention as well as the compositions themselves that may be used within the methods disclosed herein. These and other materials are disclosed herein, and it is understood that combinations, subsets, interactions or groups of these materials are disclosed and that while specific reference to each of the various individual and collective combinations and permutations of these compounds may not be explicitly disclosed, each is specifically contemplated and described herein. For example, if a particular compound is disclosed and discussed and a number of modifications that can be made to several molecules, including the compounds, are discussed, each and every combination and permutation of the compound and the modifications that are possible is specifically contemplated unless specifically indicated to the contrary. Thus, if a class of molecules A, B, and C are disclosed as well as a class of molecules D, E, and F and an example of a combination molecule A-D is disclosed, then even if each possible combination is not individually recited, each is individually and collectively contemplated, which means that combinations A-E, A-F, B-D, B-E, B-F, C-D, C-E, and C-F are disclosed. Likewise, any subset or combination of these is also disclosed. Thus, for example, the sub-group of A-E, B-F, and C-E is disclosed. This concept applies to all aspects of this application including, but not limited to, steps in methods of making and using the compositions of the invention. Thus, if there are a variety of additional steps that may be performed, it is understood that each of these additional steps may be performed with any specific embodiment or combination of embodiments of the methods of the invention.

As briefly described above, the present invention provides a niobium oxide that may be used, for example, as the active material of an electrode, such as an anode, in a lithium ion battery. The inventive composition may have a crystal structure in which there are ionic displacements in the structural framework. When such niobium oxide compositions are used in an electrochemical cell or battery, lithium ions may be reversibly inserted into the niobium oxide over the voltage range of about 1.2 V to about 1.6 V versus lithium. In many embodiments, such reversible insertion may be facile and may occur rapidly.

In one aspect, the present invention provides an anode, suitable for use in a lithium ion secondary battery, wherein the anode includes a niobium oxide as described herein.

Niobium oxides of the current invention may operate at a voltage that may be substantially matched to the lowest unoccupied molecular orbital (LUMO) of an electrolyte, such as a carbonate liquid, thereby avoiding many of the problems associated with imbalances of between the anode and electrolyte.

In one aspect, a niobium oxide, such as, for example, $TiNb_2O_7$ framework, may exhibit an oxidation and/or reduction voltage upon extraction and/or insertion of lithium ions that matches or substantially matches the lowest unoccupied molecular orbital (LUMO) of an electrolyte, particularly a liquid electrolyte, such as a carbonate liquid, suitable for use in a lithium ion secondary battery.

In one aspect, such a voltage matching capability may provide a lithium ion secondary battery containing an anode formed from the niobium oxide of the invention with improved safety properties over numerous charge/discharge cycles. In another aspect, use of such niobium oxide in the anode may can reduce the cost, complexity, and/or time needed to construct lithium ion batteries. In addition, the niobium oxide of the invention may reduce and/or prevent the irreversible capacity loss of the cathode that can occur when a mismatch between anode voltage and electrolyte LUMO results in the formation of an SEI passivation layer on the anode surface.

Although other anode materials that are safer than convention anode compositions, such as, for example, $Li_4Ti_5O_{12}$ spinel, have been identified, the niobium oxide of the present invention may provide increased energy density and/or power capability, together with improved safety.

Thus, in one aspect, the niobium oxide of the invention may provide improved safety in a lithium ion secondary battery. In another aspect, it may provide increased charge and discharge rates over conventional batteries containing conventional anode materials. In yet another aspect, the niobium oxide may provide increased capacity over conventional anode materials and previously identified safer alternatives.

Niobium Oxide and Its Preparation

A niobium oxide of the present invention may have the formula $Li_xM_{1-y}Nb_yNb_2O_7$, where $0 \leq x \leq 3$, $0 \leq y \leq 1$ and M represents Ti or Zr. Examples of such oxides include $Li_xTiNb_2O_7$ (TNO), and $Li_xTi_{1-y}Nb_yNb_2O_7$ (DTNO), such as $Li_xTi_{0.9}Nb_{0.1}Nb_2O_7$. Partially replacing Ti with Nb enhances the intrinsic conductivity of the niobium oxide composition. For example, replacing 10% Ti atoms at Ti sites with Nb atoms can transform insulating $TiNb_2O_7$ into conducting $Ti_{0.9}Nb_{0.1}Nb_2O_7$.

A niobium oxide of the present invention may be in the form of particles that may be of variable shape, from needles to disks. These particles may be from one to several hundreds of nanometers in any dimension. The particles may aggregated or not, and aggregates may be nearly spherical or ellipsoidal.

Embodiments of the invention may be prepared in different ways. For example, a niobium oxide may be prepared by conventional sol-gel methods or by conventional solid state reactions. For instance TNO and DTNO may be prepared by sol-gel and solid state techniques, which techniques have been tested as described below and have produced the desired materials.

In the sol-gel technique, TNO may be produced using $Nb_2O_5$, hydrofluoric acid, $Ti(OC_3H_7)_4$, ammonia, and citric-acid monohydrate as starting materials. First, $Nb_2O_5$ may be dissolved in hydrofluoric acid to form a transparent solution. In order to remove the $F^-$ ions from the solution, ammonia may be added to obtain a white $Nb(OH)_5$ precipitate. After the precipitate is washed and dried, the $Nb(OH)_5$ may be dissolved in citric acid to form a Nb(V)-citrate solution. A water-ethanol solution containing Ti(OC$_3$H$_7$)$_4$ may be added to this solution while the pH value of the solution is adjusted using ammonia. This final mixture containing Nb(V) and Ti(IV) ions may be stirred at 90° C. to form a citric gel. This gel may then be heated to 140° C. to obtain a precursor. The precursor may be annealed at 900° C. and at 1350° C. to obtain the TNO product.

A DTNO product may be prepared by a solid state reaction, with stoichiometric amounts of the starting materials, Nb$_2$O$_5$ Nb, and TiO$_2$. The starting materials may be thoroughly ground and pressed into pellets. The pellets may be wrapped in Ta foil, sealed in a vacuum quartz tube, and annealed. The size of the oxide particles may be tailored by the annealing temperature and time. For example, annealing may occur by heating at 900° C., then at 1100° C., with each temperature being maintained for 24 hours to obtain particles in the nanometer size range as shown in FIG. 1. Oxides containing lithium (Li) (x≠0) may be obtained electrochemically upon first discharge, the corresponding oxide without Li may be used as the cathode material in an electrochemical cell having a metallic lithium anode.

In a specific embodiment, a niobium oxide according to the present invention may be in the form of carbon coated oxide particles. The carbon coating may be continuous or discontinuous covering all or a portion of the niobium oxide. In one embodiment, the amount of the carbon coating, if present, may up to 3.0% by weight of the coated niobium oxide composition. In more specific embodiments, the carbon coating may be present in an amount of up to 0.5, 0.75, 1.0, 1.25, 1.5, 1.75, 2.0, 2.25, 2.5 or 2.75% by weight of the coated niobium oxide composition. The presence of a carbon coating enhances the electronic conductivity of the niobium oxide and may help stabilize the Nb(IV) valence state. In other aspects, the amount of carbon coating may be from about 1-2 wt % of the coated niobium oxide. In still other aspects, the amount of carbon coating, if present, may be less than about 0.5% of the coated oxide. In additional aspects, the amount of carbon coating, if present, may be greater than 3.0% by weight of the coated niobium oxide.

A carbon coating, if present, can be formed by known methods and one of skill in the art could readily select an appropriate method to form a desirable carbon coating. In one example method one may mix an organic carbon precursor with the niobium oxide, then pyrolize the mixture at a temperature within the stability temperature range of the niobium. Such pyrollysis may be carried out under a non oxidizing atmosphere.

A niobium oxide of the present invention may be used as an active electrode material, such as an active anode material in an anode composition. Such an anode composition may include at least one or more niobium oxides of formula Li$_x$M$_{1-y}$Nb$_y$Nb$_2$O$_7$, and optionally additional components selected for instance from electronic conducting agents and binders. The electronic conducting material may include a carbon material, such as, for example, carbon black, acetylene back, graphite, or carbon nanotubes. The binder may include a polymer such as polyacrylonitrile (PAN), polyvinylidene fluoride (PVDF), polyvinylpyrrolidone (PVP) or polymethylmethacrylate (PMMA). In a specific embodiment, the electrode material may contain from 60 to 75 wt % of Li$_x$M$_{1-y}$Nb$_y$Nb$_2$O$_7$. In a more specific embodiment, it may also contain from 30 to 15 wt % of electronic conducting agent, and/or up to 10 wt % of a binder. In a specific example of anode composition, the proportions of niobium oxide, electronic conducting agent and binder may be 65:30:5 (wt %).

Electrodes and Batteries

In another aspect, the present invention provides an anode including an active anode material containing a niobium oxide of the invention. The anode material may be in the form of an anode composition as described above. The anode active anode material may be provided on a current collector. The current collector may be, for example, made of aluminum or copper. The anode may be used as the anode, for example, in a lithium ion secondary battery.

In one example method of obtaining an anode in a coin cell, the anode active material and a carbon material may first be mixed completely, then a binder may be added and the mass may be mixed again. The mixture may then rolled into thin sheets and punched into circular disks. A disk thus obtained may be placed on a current collector made, for example, of copper or aluminum. The typical mass of each thin circular disk of anode material may be 2-5 mg. One of ordinary skill in the art, using the teachings of this disclosure, may form anodes containing niobium oxide active material suitable for other types of electrochemical cells and batteries.

In one embodiment, a lithium ion secondary with an anode containing a niobium oxide of the invention may operate based on a Li insertion/extraction process at 1.1-1.6 V versus Li$^+$/Li$^0$ that is fully reversible. Such a battery may be capable of fast charge and discharge rates. The extrinsic electronic conductivity of the niobium oxide may be enhanced by carbon coating the niobium oxide. Similarly, the intrinsic conductivity may be improved by substituting Nb for Ti. C—Ti$_{0.9}$Nb$_{0.1}$Nb$_2$O$_7$ is one example of a niobium oxide having enhanced intrinsic conductivity.

A lithium ion secondary wherein the anode is as described herein may exhibit a reversible specific capacity of about 285 mAh/g on cycling between 1.0 and 2.5 V versus Li$^+$/Li$^0$. Such a capacity may be achieved with over 95% efficiency at 0.2 C. The ability to retain such a specific capacity of about 190 mAh/g at 16 C makes C-TNO or C-DTNO an attractive anode material alternative compared to conventional materials, such as the spinel Li$_4$Ti$_5$O$_{12}$. FIG. 1$b$ illustrates Nb and Ti atoms and a 2D interstitial space for Li insertion. Provided three lithium ions (Li$^+$) per formula unit are inserted, such a structure provides a high theoretical capacity of 387.6 mAh/g for overlapping Ti(IV)/Ti(III) and Nb(V)/Nb(III) redox couples.

In another embodiment, a lithium ion secondary battery may contain a cathode, which may be made of a composite cathode material on a current collector. The current collector may be, for example, made of a copper foil or an aluminum foil. The composite material may contain an active material including a compound that allows reversible insertion of lithium ions at a potential more oxidizing than that of the anode. The composite cathode material may also contain an electronic conducting agent and/or optionally a binder. The electronic conducting agent and the binder may be selected from those mentioned for the anode. The active material may be selected from transition-metal oxides able to provide a host framework into which lithium ion may be reversibly inserted and extracted. A specific example of such a material is an oxide with a spinel framework, [Ni$_{0.5}$Mn$_{1.5}$]O$_4$, into which lithium ions may be reversibly inserted to form Li$_z$[Ni$_{0.5}$Mn$_{1.5}$]O$_4$ with 0≤z≤0, and from which lithium ions may be reversibly extracted.

In a lithium ion secondary battery of the invention, the electrolyte may include a lithium salt dissolved in a liquid solvent or in a polymer. In certain embodiments, the lithium salt may be selected from lithium salts conventionally used is lithium ion secondary batteries. Examples of anions of the lithium salt include perfluoroalcanesulfonates, bis(perfluoro-alkylsulfonyl) imides, perchlorate $(ClO_4)^-$, hexafluorophosphate $(PF_6^-)$ or tetrafluoroborate $(BF_4^-)$.

The liquid solvent may be an organic carbonates or an ionic liquids. Examples of organic carbonates include propylene carbonate, ethylene carbonate, and dialkyl carbonates (such as dimethylcarbonate, diethylcarbonate and methylpropylcarbonate).

The polymer may be a polar polymer selected from solvating, crosslinked or non-crosslinked polymers. A solvating polymer may be a polymer that contains solvating units containing at least one hetero atom chosen from sulfur, oxygen, nitrogen and fluorine. Example solvating polymers include polyethers of linear, comb or block structure, forming or not forming a network, based on poly(ethylene oxide), or polymers containing the ethylene oxide or propylene oxide or allyl glycidyl ether unit, polyphosphazenes, crosslinked networks based on polyethylene glycol crosslinked with isocyanates or networks obtained by poly-condensation and bearing groups that allow the incorporation of crosslinkable groups.

In one example electrochemical half-cell, the parameters of which have been verified experimentally, one electrode may contain a carbon coated niobium oxide (C-TNO) as the active material, the other electrode may contain metallic lithium, and the electrodes may be separated by a separator impregnated with a liquid electrolyte. In such an electrochemical cell, the potential versus $Li^+/Li^0$ may be smoothly increased from 1.3 to 1.6 V in a solid-solution reaction upon extraction of 1.5 $Li^+$ per $Li/TiNb_2O_7$. The potential versus $L^+/Li^0$ may be smoothly increased from 1.5 to 2.6 $Li^+$ per TNO. A two-phase insertion reaction retains the voltage at 1.6 V versus $Li^+/Li^0$. On discharging to 0.8 V in said half-cell, an SEI layer may formed, but in subsequent charge/discharge cycles, C-TNO may exhibit a reversible specific capacity of about 350 mAh/g, as demonstrated by FIG. 4b.

In another example, an electrochemical full cell, the parameters of which have also been verified experimentally, may be construed. In such a cell the anode may contain a carbon coated niobium oxide (C-TNO) as the active material and the cathode may contain $Li_z[Ni_{0.5}Mn_{1.5}]O_4$ as the active material. Both electrodes may be separated by a separator impregnated with a liquid electrolyte. In such a full C-TNO/$Li_z[Ni_{0.5}Mn_{1.5}]O_4$ cell, capacity may be limited by the anode. Such a full cell may exhibit a reversible 3.0 V charge/discharge over 30 cycles, whereas a similar cell with a capacity limited by the cathode may exhibit a capacity fade due to a lowering of the cathode potential to near 5.0 V versus $Li^+/Li^0$.

EXAMPLES

The following examples are provided to further illustrate certain embodiments of the invention. They are not intended to limit the invention to the components, compositions, systems, techniques, or methods described in these examples. Unless indicated otherwise, parts are parts by weight, temperature is in ° C. or is at ambient temperature, and pressure is at or near atmospheric pressure.

Example 1

Synthesis of TNO

TNO was prepared by a sol-gel technique. $Nb_2O_5$ (Alfa, 99.9%), hydrofluoric acid (40/70 $HF/H_2O$), $Ti(OC_3H_7)_4$, ammonia, and citric-acid monohydrate were used as starting materials. First, $Nb_2O_5$ was dissolved in hydrofluoric acid to form a transparent solution. In order to remove the $F^-$ ions from the solution, ammonia was added to obtain a white $Nb(OH)_5$ precipitate. After the precipitate was washed and dried, the $Nb(OH)_5$ was dissolved in citric acid to form a Nb(V)-citrate solution. A water-ethanol solution containing $Ti(OC_3H_7)_4$ was added to this solution while the pH value of the solution was adjusted by using ammonia. This final mixture containing Nb(V) and Ti(IV) ions was stirred to form a citric gel at 90° C. This gel was heated to 140° C. to obtain a precursor. The precursor was then annealed at 900° C. and at 1350° C. to obtain the TNO product.

Example 2

Synthesis of DTNO

DTNO was prepared by conventional solid state reaction. Stoichiometric quantities of the starting materials, $Nb_2O_5$ (Alfa, 99.9%), Nb (Alfa, 99.9%), and $TiO_2$ (Alfa, 99.9%), were thoroughly ground and pressed into pellets. The pellets were wrapped in Ta foil, sealed in a vacuum quartz tube, and annealed at 1100° C. for 24 h.

Example 3

Synthesis of C-TNO and C-DTNO

C-TNO and C-DTNO were prepared by ball-milling the as-prepared samples of Examples 1 and 2 into very fine powder and before a sucrose solution was added as the precursor for carbon coating. The mixtures thus obtained, with different concentrations of sucrose (ranging from 2 to 5 wt %), were dried at 80° C. before the precursors were annealed at 550° C. for 6 h in a flowing argon atmosphere.

Example 4

Characterization of the Niobium Oxide Samples

Micrographs of samples were taken with a scanning electron microscope (SEM, SHIMDAZU SSX-550). FIGS. 1(a) and 1(d) correspond respectively to a TNO sample obtained according to the method of Example 1, and to a C-TNO sample prepared according to the method of Example 3.

FIG. 1(b) illustrates the crystal structure of TNO: with lattice parameters in C2/m space group a=20.351(3) Å, b=3.801(2) Å, c=11.882(2) Å, $\alpha=\gamma=90°$, $\beta=120.19(1)$; Nb occupancy ⅔ and Ti occupancy ⅓ in the same site (48109-ICSD).

FIG. 1(c) is a high resolution transmission electron micrograph (HR-TEM) of the TNO sample of Example 1, with the inset showing the corresponding SAED pattern. It shows that the distance between layers of edge-shared octoedra in $NbTiO_6$ is 0.873 nm.

Figure 2:
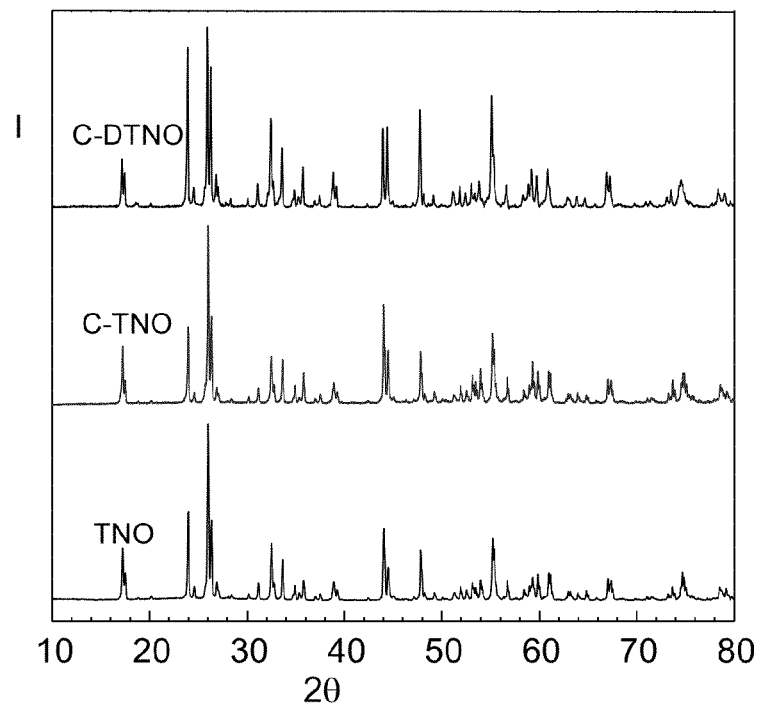
FIG. 2 illustrates the X-ray powder diffraction patterns of TNO, C-TNO, and C-DTNO samples, in accordance with various aspects of the present invention. The intensity I is expressed in arbitrary units. The diffraction angle 2θ is in degrees.

Powder X-ray diffraction (XRD) data were collected with a Rigaku D/max X-ray diffractometer (Cu $K_\alpha$ radiation, λ=1.5418 Å) operating at 40 kV and 30 mA in a 2θ range of 10-80° with a step of 0.04°. X-ray diffraction patterns are shown on FIG. 2 for the NTO sample of example 1, C-TNO and C-DTNO samples of Example 3. The intensity I (in arbitrary units) is given in the 2θ range 10° to 80°, for TNO, C-TNO and C-DTNO. FIG. 2 shows that the samples tested are single phase with the structure shown by FIG. 1(b).

Figure 3:
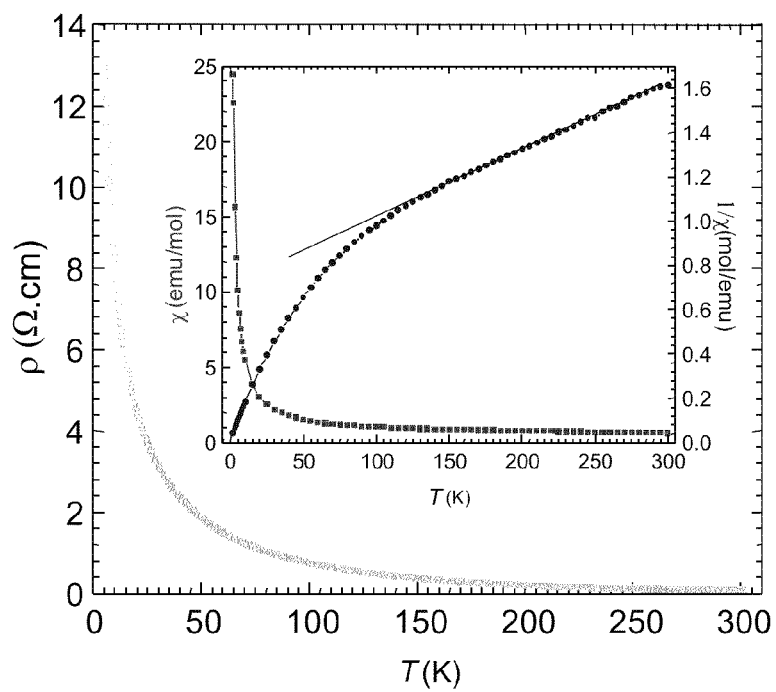
FIG. 3 is related to a DTNO sample. The  curve illustrates the resistivity ρ (in Ω.cm) of the DTNO sample under zero applied magnetic field up to 300 K obtained by the standard four-probe method. The inset illustrates the temperature dependence of zero-field-cooled (ZFC) magnetic susceptibility. χ (in emu/mol) is represented by  and 1/χ (in mol/emu) is represented by , in accordance with various aspects of the present invention.

The resistivity of the DTNO sample of Example 2 is 0.1 Ω·cm at room temperature, measured under zero magnetic field up to 300 K with the standard four-probe method. The inset of FIG. 3 illustrates the temperature dependence of the zero-field-cooled (ZFC) susceptibility for the DTNO sample. These data show that the substitution of 0.1 Nb for Ti provides good electronic conductivity.

Example 5

Preparation of Electrodes and Cells

Electrodes were fabricated from a 65:30:5 (wt %) mixture of active material, acetylene black as an electronic conductor, and polytetrafluoroethylene as a binder. The active material and conductor were mixed completely first, then the binder was added and the mass mixed again. The mixture was rolled into thin sheets and punched into 7-mm-diameter circular disks as electrodes. The typical mass of each electrode material mixture thin sheet was 2-5 mg.

Electrochemical measurements were carried out with CR2032 coin cells. In each cell, the working electrode was a 7-mm diameter thin disk prepared according to the method described in the previous paragraph, the counter electrode was a lithium electrode, and the electrolyte was 1 M $LiPF_6$ in 1:1 EC/DEC. The cells were assembled and sealed in a glove box under argon atmosphere, then taken out of the glove box and placed in a battery-testing system (Arbin BTS-2043). They were aged for 12 h before the first discharge to ensure full absorption of the electrolyte into the electrode. A 5 min rest period was employed between the charge and discharge steps.

Example 6

Cycling a Li/C-NTO cell

A typical voltage versus state-of-charge profile of a Li/C-TNO cell cycle is shown in FIG. $4A_1$. The C-TNO electrode acts as a cathode. FIG. $4A_1$ represents the charge/discharge galvanostatic curves at C/10 for a Li/C-TNO cell cycled between 1.0 and 2.5 V. The voltage V is in Volts (vs $Li^+/Li$), x is the number of lithium ions in TNO and C is the capacity (mAh/g). "$1\text{-}5^{th}$" means that the curves correspond to the first 5 cycles. On the initial discharge, (which would correspond to a charge if the C-TNO electrode would act as an anode), the voltage drops smoothly to 1.0 V with a plateau at 1.6 V versus $Li^+/Li^0$ and exhibits a capacity of 2.6 Li/formula unit in the voltage range 1.6>V>1.0 V. The cut-off voltage was located at 1.0 V to avoid the formation of an SEI layer. After the first charge, the entire up-take of Li is removed on discharge with a reversible capacity of 285 mAh/g, which indicates that, indeed, no SEI layer is formed if the discharge (which would be a charge if the C-NTO electrode would act as an anode) is stopped at V=1.0 V. FIG. $4A_2$ represents the specific capacity C (mAh/g) in relation to the cycle number N, during charge (■■■) and during discharge (●●●. Both curves on the left part correspond to a discharge/charge rate of 0.1 C, and both curves on the right part correspond to a discharge/charge rate of 0.2 C. FIG. $4A_2$ shows an excellent efficiency of energy storage, over 95%, at a discharge/charge rate of 0.1 C over 30 cycles with no capacity fade. At a discharge/charge rate of 0.2 C, the specific capacity is 275 mAh/g, with no capacity fade for the next 30 cycles, with even higher energy storage efficiency.

FIG. $4B_1$ shows the charge/discharge galvanostatic curves at C/10 for a similar Li/C-NTO cell cycled between 0.4 and 2.5 V. The voltage V is in Volts (vs $Li^+/Li$), x is the number of lithium ions in TNO and C is the capacity (mAh/g). "1th" designates the curve corresponding to the $1^{st}$ cycle. "4,3,2 th" designates the curves corresponding respectively to the $2^{nd}$, $3^{rd}$ and $4^{th}$ cycles. FIG. 4(B) shows the first discharge to 0.4 V. The irreversible profile below 0.9 V on the first discharge indicates formation of an SEI layer at a voltage lower than 0.9 V. FIG. $4B_2$ represents the specific capacity C (mAh/g) in relation to the cycle number N, during charge (■■■) and during discharge (●●●). It shows that subsequent cycles exhibit a reversible capacity of about 300 mAh/g, which shows that the Li-permeable SEI layer protects the surface of the electrodes from further reduction of the electrolyte.

Example 7

Cycling a C-TNO (Anode)/LNMO (Cathode) Cell

Experiments were made on a cell wherein the anode is a C-TNO electrode according to Example 5, the electrolyte is a 1 M $LiPF_6$ in 1:1 EC/DEC solution, and the cathode is made of a 65:30:5 (wt %) mixture of active material, acetylene black as an electronic conductor, and polytetrafluoroethylene as a binder, the active material of the cathode being the spinel $Li[Ni_{0.5}Mn_{1.5}]O_4$ (LNMO). FIGS. $4C_1$, $4C_2$ and 4D demonstrate a practical application of C-TNO as an anode material in a lithium ion battery over the limited voltage ranges 1.5≤V≤3.5 V and 1.5≤V≤3.3 V, versus $Li^+/Li^0$, respectively. "$1\text{-}10^{th}$" or "10-1th" means that the curves correspond to the first 10 cycles. Depending on which electrode is limiting, the specific capacities of the cells were calculated based on the weight of the C-TNO anode and the LNMO cathode, respectively. "C-TNO limited cell" means a cell in which the amount of C-TNO at the anode is lower than the amount which would allow the number of $Li^+$ ions inserted to be equal to the number of $Li^+$ ions that can be extracted from the cathode material. "LNMO limited cell" means a cell in which the amount of LNMO at the cathode is lower than the amount which would allow the number of $Li^+$ ions inserted to be equal to the number of $Li^+$ ions that can be extracted from the anode material.

A C-TNO limited cell as defined above was cycled at a rate of C/10 in the voltage range of 1.5-3.5 V. FIGS. $4C_1$ and $4C_2$ show the C-TNO-limited cell exhibited a perfect cycling performance in the first 30 cycles with a high coulombic efficiency of more than 95%.

Figure 4D:
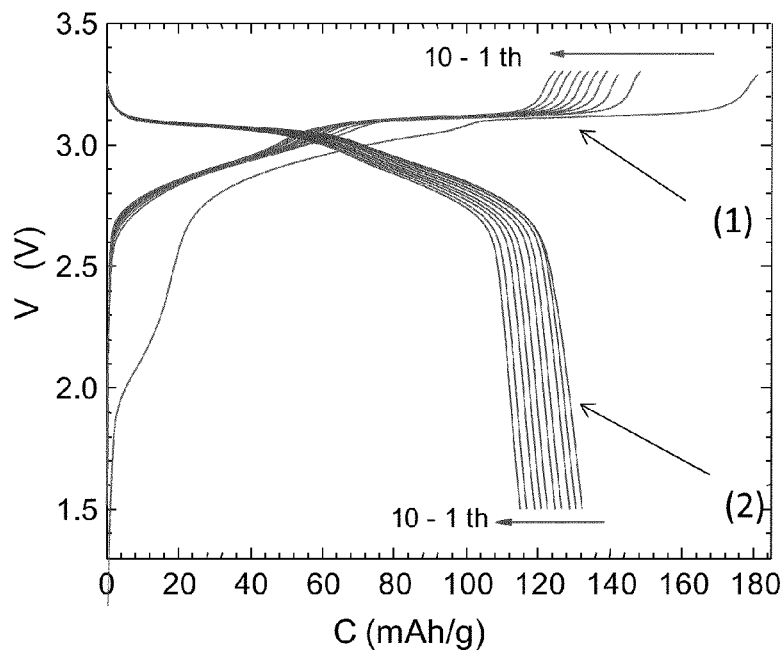
FIG. 4D represents charge/discharge galvanostatic curves for a LNMO/C-TNO full cell at C/10 with capacity limited by LNMO cathode (the amount of C-TNO being in excess compared to the amount of LNMO) cycled between 1.5 and 3.3 V (vs Li$^+$/Li) (FIG. 4D), each in accordance with various aspects of the present invention. On FIGS. 4A1, 4B1, 4C1 and 4D, curves marked (1) correspond to charge and curves marked (2) correspond to discharge.

A LNMO limited cell as defined above was cycled at a rate of C/10 in the voltage range of 1.5-3.3 V. FIG. 4D shows the LNMO-limited cells gave a poor cycling performance with a capacity loss of 1.3% per cycle and a lower coulombic efficiency of 87.8%.

Two distinct cycling performances were found for different cutoff voltages. For the C-TNO-limited full cells, the potential of the LNMO cathode is still at 4.7 V versus Li metal, that of the C-TNO anode drops down to 1.2 V. However, with the LNMO-limited cell under the same conditions, the potential of the anode is at 1.5 V, that of the LNMO cathode rises to about 5 V where many adverse side reactions can occur between the electrolyte and the strongly oxidative cathode. Carbonate electrolytes are oxidized above 4.3 V and became unstable above 5 V versus $Li^+/Li^0$.

Example 8

Charge/Discharge Properties

The charge/discharge properties of the bare TNO (non carbon coated), C-TNO and C-DTNO in cells similar to those of Example 6 were also investigated. The cells were tested in three different modes: (I) discharged at a fixed 0.1 C rate, charged over the range of 0.1-32 C; (II) charged at a fixed 0.1

Figure 5A:
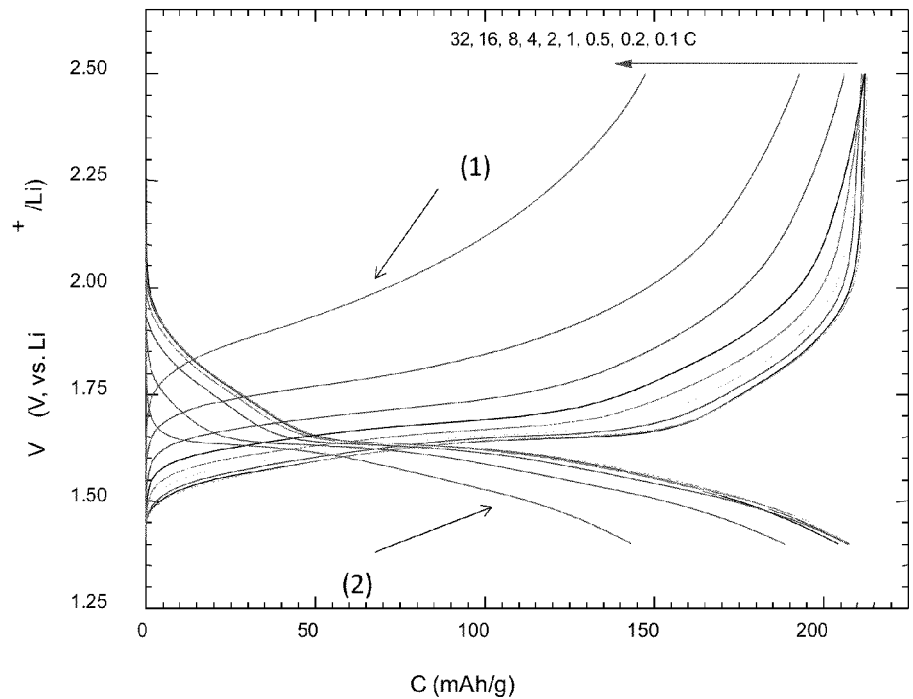
FIGS. 5A and 5D represent, respectively, charge/discharge profiles and capacity retentions under model (I)
Figure 5B:
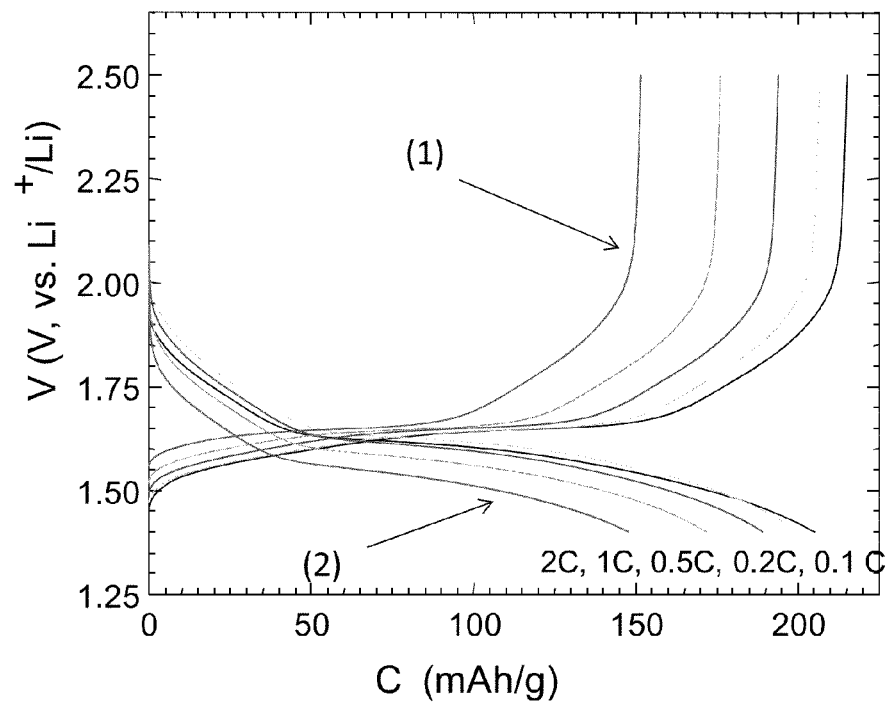
FIGS. 5B and 5E represent, respectively, charge/discharge profiles and capacity retentions under model (II)
Figure 5C:
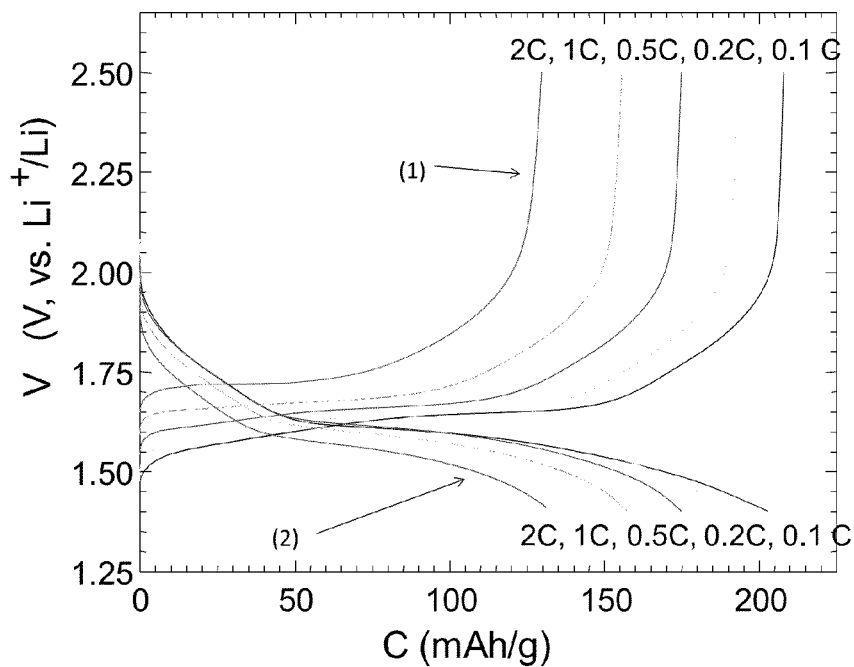
FIGS. 5C and 5F represent, respectively, charge/discharge profiles and capacity retentions under model (III), each in accordance with various aspects of the present invention.

C, discharged over the range of 0.1-2 C; and (III) charged and discharged both over the range of 0.1-2 C. FIGS. 5A, 5B, and 5C show typical charge/discharge profiles of C-TNO in the three different modes. In FIG. 5A, the charge curve at a charge rate of 0.1 C and the corresponding discharge curve are the curves (1) and (2) at the right side, the charge curve at a charge rate of 32 C and the corresponding discharge curve are the curves (1) and (2) at the left side, and the curves at the intermediate rates are between them, with a rank corresponding to the number range 32, 16, 8, 4, 2, 1, 0.5, 0.2, 0.1 C. In FIG. 5B, the discharge curve at a discharge rate of 0.1 C and the corresponding charge curve are the curves (1) and (2) at the right side, the discharge curve at a discharge rate of 2 C and the corresponding charge curve are the curves (1) and (2) at the left side, and the curves at the intermediate rates are between them, with a rank corresponding to the number range 2, 1, 0.5, 0.2, 0.1 C. In FIG. 5C, the charge curve at a charge rate of 0.1 C and the corresponding discharge curve at a rate of 0.1 C are the curves (1) and (2) at the right side, the charge curve at a charge rate of 2 C and the corresponding discharge curve at a rate of 2 C are the curves (1) and (2) at the left side, and the curves at the intermediate rates are between them, with a rank corresponding to the number range 2, 1, 0.5, 0.2, 0.1 C. The most efficient mode is mode (I), where the electrode can be charged up to a capacity of 200 mAh/g at a rate as high as 8 C, which means the electrode material possesses an outstanding $Li^+$-ion extractive diffusivity.

Figure 5D:
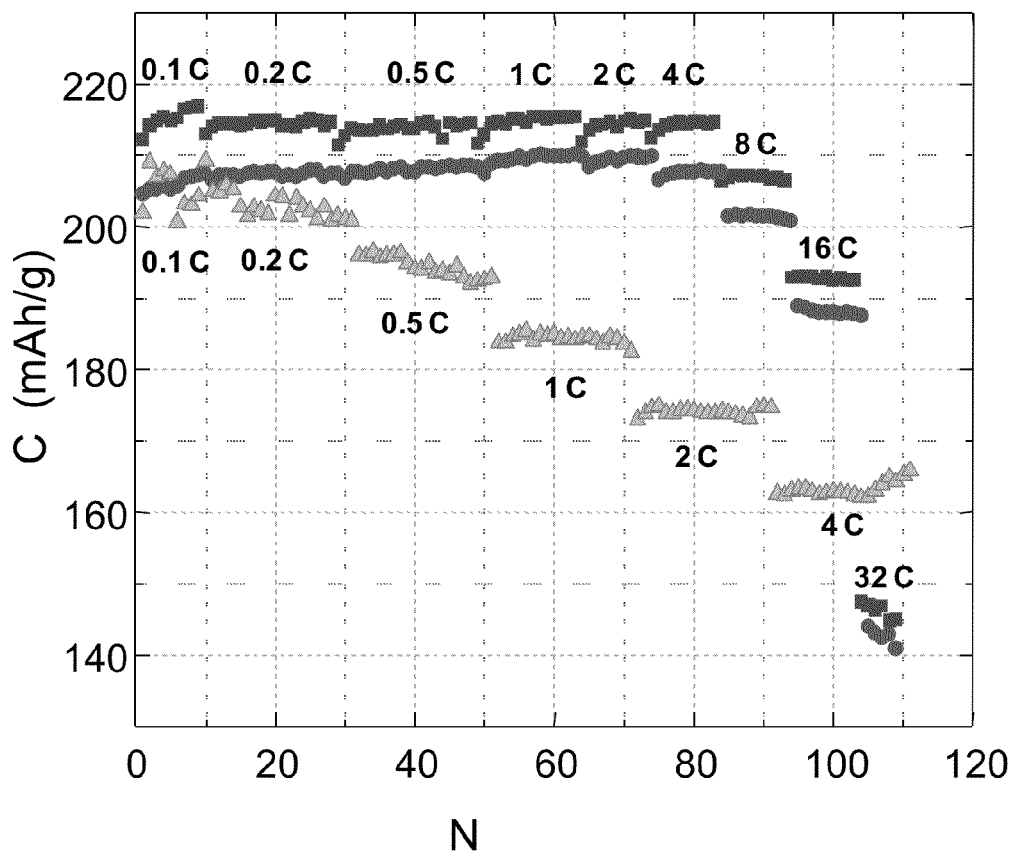

The cycle performances in mode (I) of bare TNO and C-TNO are compared in FIG. 5D, which shows the evolution of the specific capacity for C-TNO at various charge rates (from 0.1 C to 32 C) ■■■■■ and the corresponding discharge at a rate of 0.1 C ●●●●●, and the evolution of the specific capacity for bare TNO at a discharge rate of 0.1 C corresponding to various charge rates △△△△△. At low rates, both of them exhibit comparable performances. However, at higher rates, the electronic contact of TNO with the current collector becomes insufficient and C-TNO reveals a better electrochemical behavior than bare TNO. A specific reversible capacity of 190 mAh/g is obtained in C-TNO at rates of 16 C, whereas the specific capacity of the bare TNO drops to 160 mAh/g at 4 C.

Figure 5E:
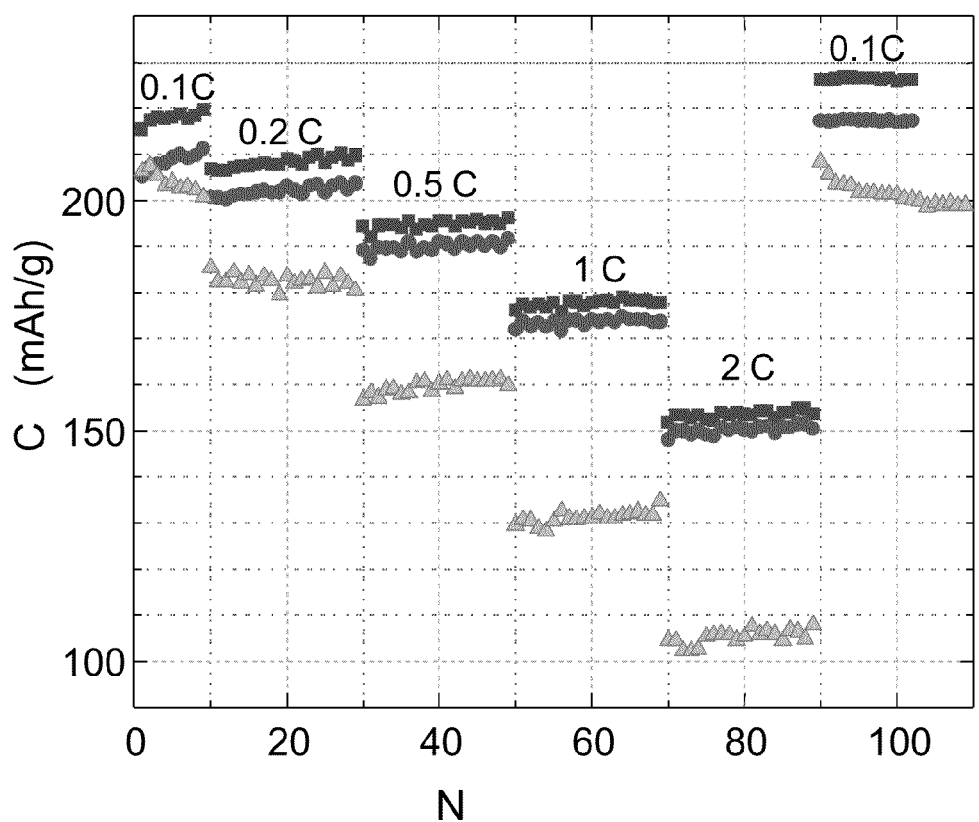

In mode (II), the electrochemical properties of bare TNO and C-TNO are compared in FIG. 5E which shows the evolution of the specific capacity for C-TNO at a charge rate of 0.1 C ■■■■■■ and at the corresponding discharge at various rates (from 0.1 C to 2 C) ●●●●, and the evolution of the specific capacity for bare TNO at various discharge rates (the charge rate being 0.1 C) △△△△. The performance improvement by the carbon coating is more pronounced at higher rates.

Figure 5F:
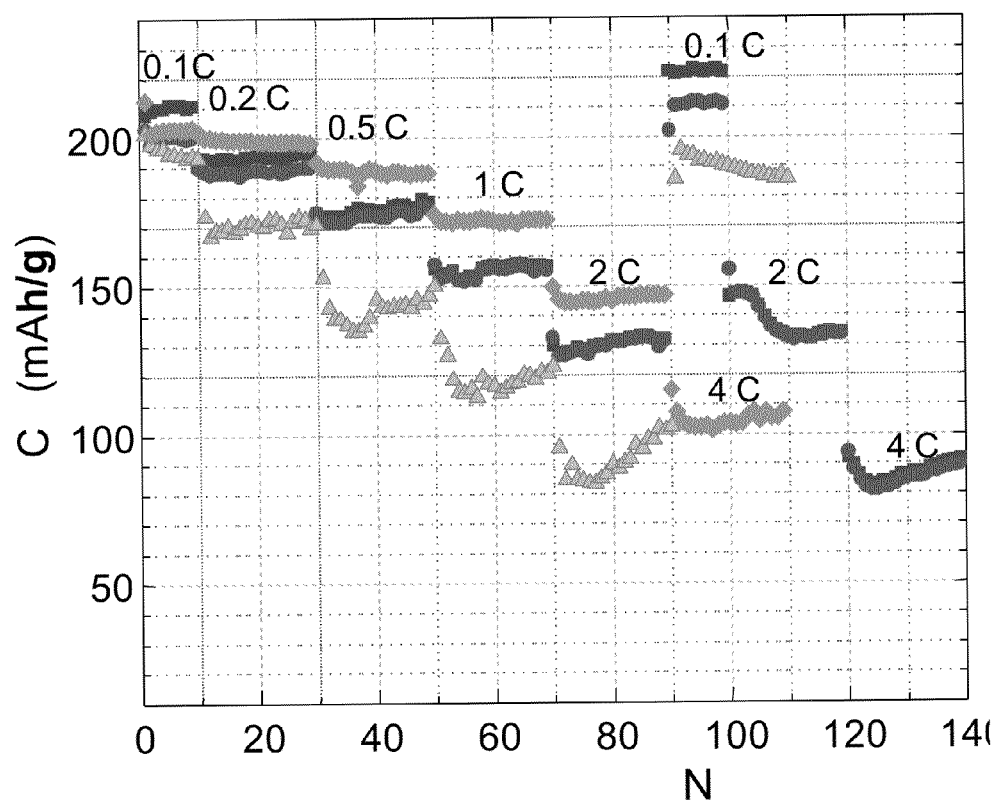

Comparing modes (III) and (II), an apparent difference in the rate of Li-ion transfer in the two different modes is observed. To enhance further the electrochemical properties of C-TNO, a C-DTNO was used as the anode material, i.e. a carbon coated oxide of formula $Ti_{0.9}Nb_{0.1}Nb_2O_7$. In mode (III), the cycle performances of the bare TNO, C-TNO, and C-DTNO are shown in FIG. 5F, in which ■■■ represents charge of C-TNO at various rates, ●●● represents discharged of C-TNO at various rates, △△△ represents discharges of bare TNO at various rates and ◇◇◇ represents C-DTNO at various rates. FIG. 5F shows that the electrochemical performance of the C-DTNO is better than that of bare TNO and C-TNO, which is due to the intrinsic and extrinsic conductivity improvement by atom substitution and carbon-coating.

Example 9

Rate Capability

Figure 6A:
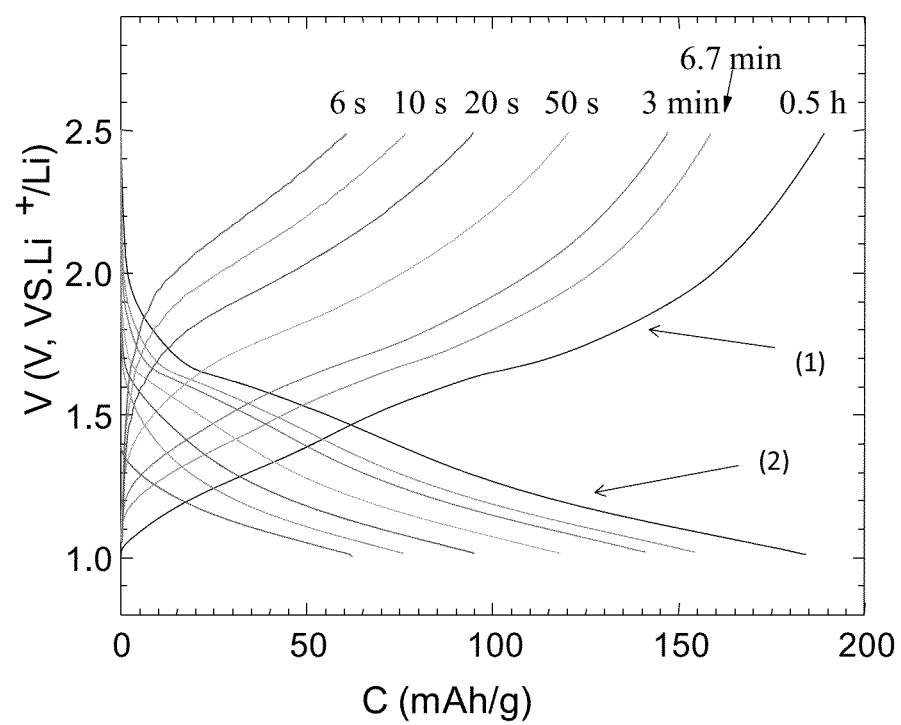
FIGS. 6A and 6B represent, respectively, charge/discharge profiles and capacity retention.

In order to establish the true rate capability of the niobium oxide, a C-DTNO anode and coin cells were prepared according to the method of Example 5. The electrode material weight composition in the working electrode was: C-DTNO (65%), carbon black (30%) and PVDF (5%). The discharge rate was fixed at 2 C (0.5 hour for full discharge) and charging rates were increased gradually. In FIG. 6(A), V is the voltage, in Volts (vs $Li^+$/Li) and C is the capacity (mAh/g). FIG. 6 illustrates electrochemical characterization of the C-DTNO at high rate. The discharge current was fixed at 2 C without any holding of the voltage. Charge was carried out at various rates, starting from low rate corresponding to a charging time of 0.5 h (curves at the right side) up to a very high rate until the charging time reaches 6 seconds (curves at the left side).

Figure 6B:
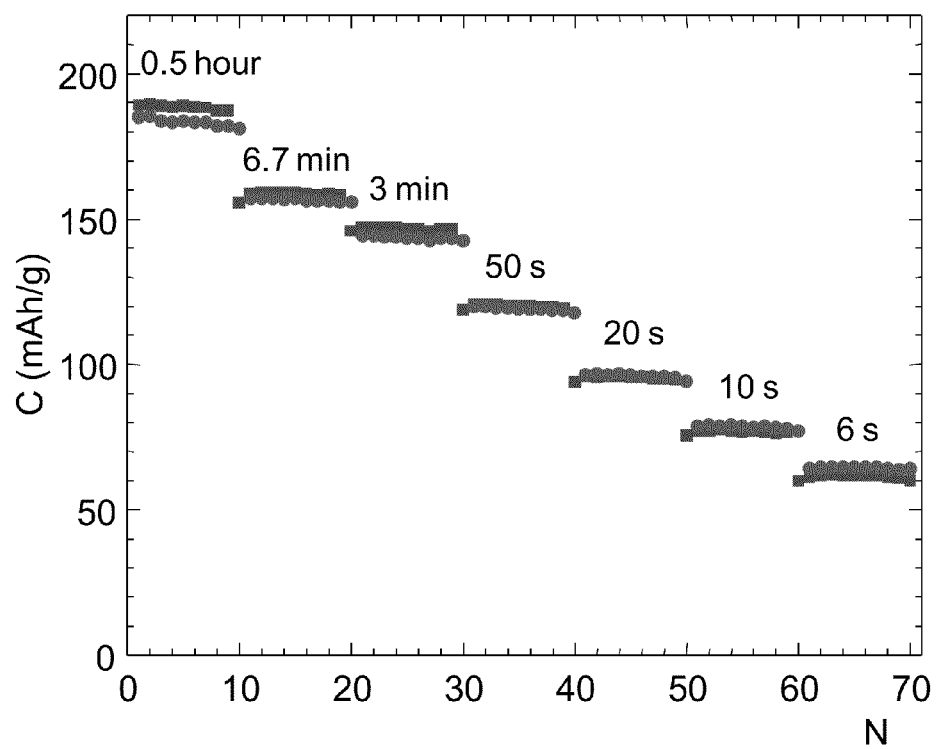

The results in FIG. 6B show that extremely high charging rates can be achieved for the active material: more than 100 mAh/g capacities can be achieved at a 20-second full charge; 70 mAh/g can still be obtained at a 6-second full charge. Such charging rates are comparable to those reported for the $Li_4Ti_5O_{12}$ anode. In FIG. 6B, ■■■ represents the C-DTNO charge at various rates, and ●●●●●●● represents discharge at fixed 0.5 C.

Figure 7:
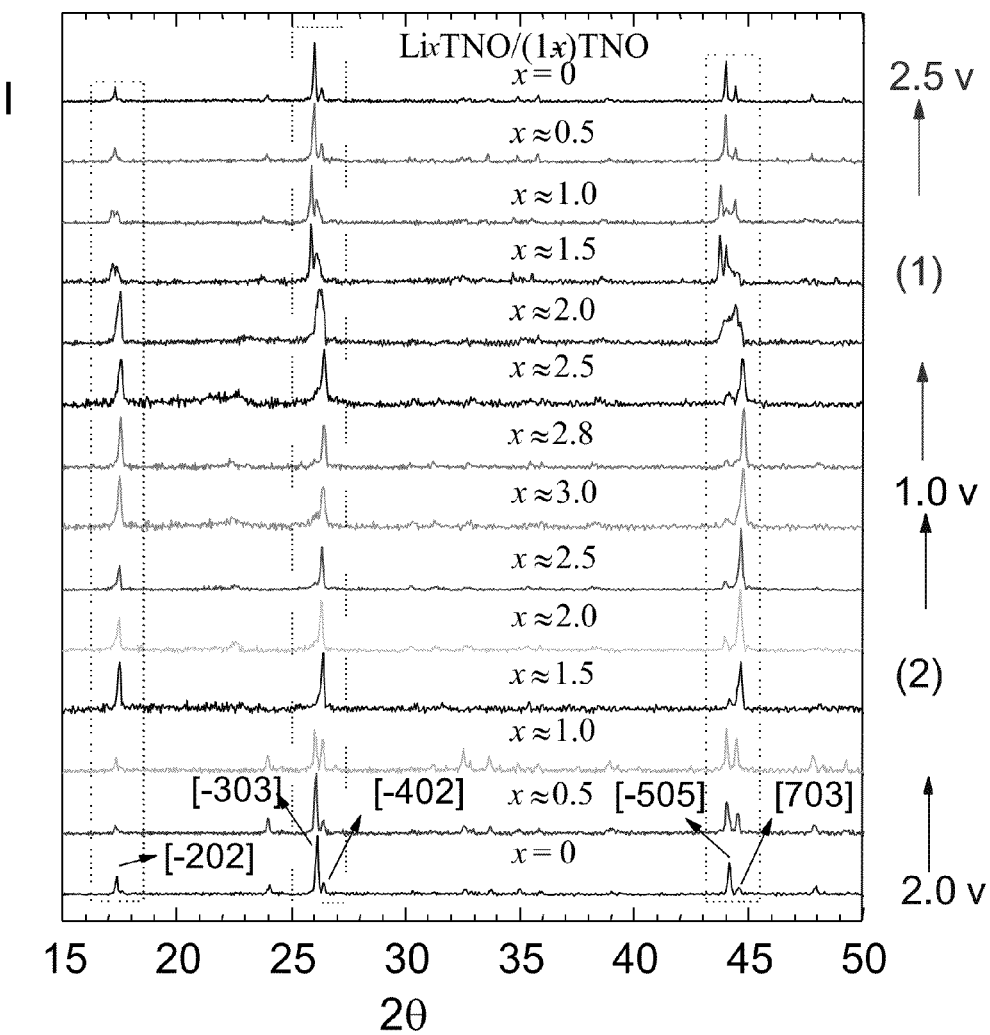
FIG. 7 illustrates ex-situ X-ray diffraction performed on TNO from a TNO/Li cell discharged and charged at a rate of C/10. A continuous growing and diminishing of the diffraction peaks (402) and (703) during the discharge/charge of the TNO indicates a two-phase Li insertion/extraction mechanism, in accordance with various aspects of the present invention. On the right hand scale, (1) represents charge and (2) represents discharge.

To obtain a better insight into the mechanism of $Li^+$-ion insertion/extraction in TNO, ex situ X-ray diffraction measurements were carried out (see FIG. 7). During cell discharge (where the voltage varies from 2.0 V corresponding to x=0, to 1.0 V corresponding to x=3), Bragg peaks [−402] and [703] grew gradually. They were accompanied by [−505] and [703] peaks diminishing in the range of 0<x<3.0. Upon recharge (where the voltage varies from 1.0 V corresponding to x=3, to 2.5 V corresponding to x=0), a reverse situation was seen, and the Bragg peaks were almost totally recovered at x=0 after all $Li^+$ ions were removed. As deduced from the XRD measurements detailed above, the conclusion is that the mechanism of $Li^+$-ion insertion/extraction in the TNO system includes a two-phase process, in which a lithium-rich (2.6 $Li^+$/formula unit) and a lithium-poor phase (1.5 $Li^+$ per formula unit) coexist.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

The invention claimed is:

1. A lithium ion secondary battery comprising:
   an anode, the anode further comprising a niobium oxide comprising the general formula $Li_xM_{1-y}Nb_yNb_2O_7$, wherein 0≤x≤3, 0≤y≤1 and M represent Ti or Zr,
   a cathode, and
   an electrolyte.

2. The battery according to claim 1, wherein the niobium oxide comprises the general formula $Li_xTiNb_2O_7$, wherein 0≤x<3.

3. The battery according to claim 1, wherein the niobium oxide comprises the general formula $Li_xTi_{1-y}Nb_yNb_2O_7$, wherein 0≤x≤3 and 0≤y≤1.

4. The battery according to claim 1, wherein the niobium oxide is in the form of a particle.

5. The battery according to claim 4, wherein the niobium oxide is in the form of agglomerated particles.

6. The battery according to claim 4, further comprising a carbon coating on the niobium oxide.

7. The battery according to claim 6, wherein the carbon coating represents up to 3% by weight of the total weight of carbon coating and niobium oxide.

8. The battery according to claim 1, the anode further comprising an electronic conducting agent and/or a binder.

9. The battery according to claim 8, the anode comprising 60 to 75% by weight niobium oxide or niobium oxide and carbon coating, 15 to 30% by weight electronic conducting agent, and 0 to 10% by weight binder.

10. The battery according to claim 9, wherein the electronic conducting agent comprises a material is selected from the group consisting of carbon black, acetylene back, graphite, carbon nanotubes, and any combinations thereof.

11. The battery according to claim 9, wherein the binder comprises a material selected from the group consisting of polyacrylonitrile, polyvinylidene fluoride, polyvinylpyrrolidone, polymethylmethacrylate, and any combinations thereof.

12. The battery according to claim 1, wherein the cathode comprises an active material operable to allow reversible insertion of lithium ions.

13. The battery according to claim 12, wherein the cathode comprises $Li[Ni_{0.5}Mn_{1.5}]O_4$.

14. The battery according to claim 1, wherein the electrolyte comprises a lithium salt dissolved in a liquid solvent or in a polymer.

15. The battery according to claim 14, wherein the lithium salt comprises a material selected from the group consisting of perfluoroalcanesulfonates, bis(perfluoro-alkylsulfonyl) imides, perchlorate, hexafluorophosphate, tetrafluoroborate, and any combinations thereof.

16. The battery according to claim 14, wherein the liquid solvent comprises an organic carbonate or an ionic liquid.

17. The battery according to claim 14, the polymer comprises a polar solvating, crosslinked, or non-crosslinked polymer.

* * * * *